Aug. 5, 1958     W. E. MARTIN     2,846,237
TRUCK HITCH FOR TRAILING VEHICLES
Original Filed May 26, 1949     3 Sheets-Sheet 1

INVENTOR:
William E. Martin
BY
Eberhard E. Walley
Atty.

Aug. 5, 1958  W. E. MARTIN  2,846,237
TRUCK HITCH FOR TRAILING VEHICLES
Original Filed May 26, 1949  3 Sheets-Sheet 2

INVENTOR:
William E. Martin
BY
Eberhard E. [signature]
Atty.

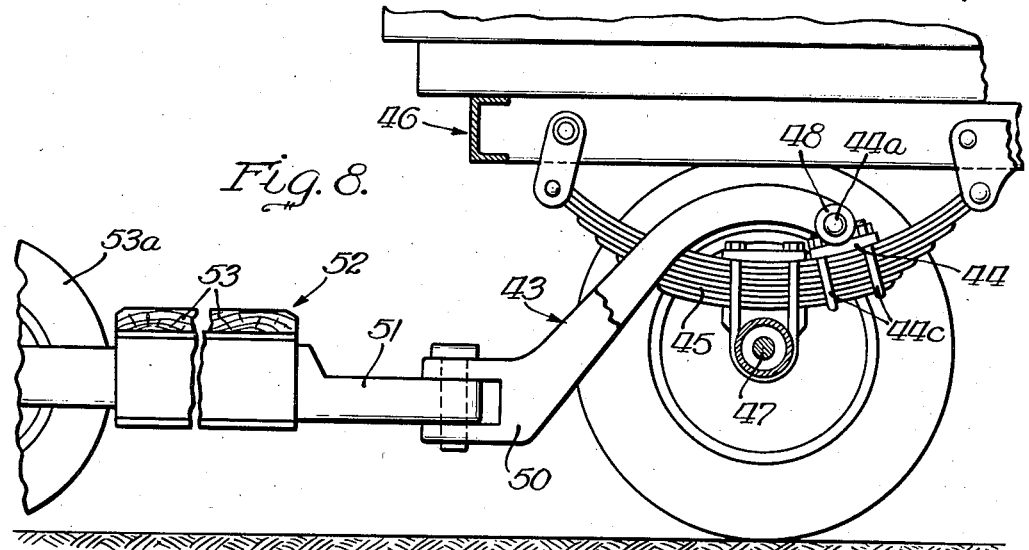
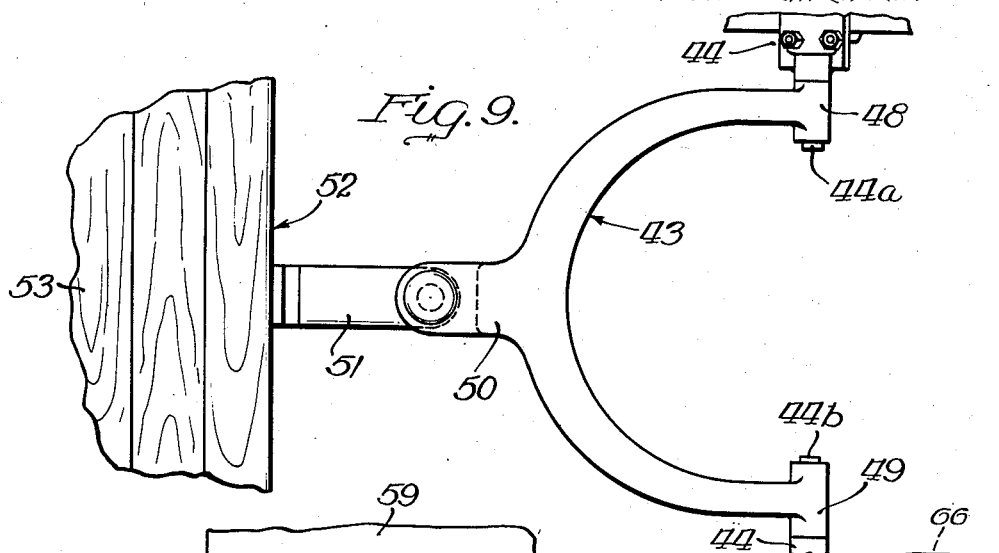
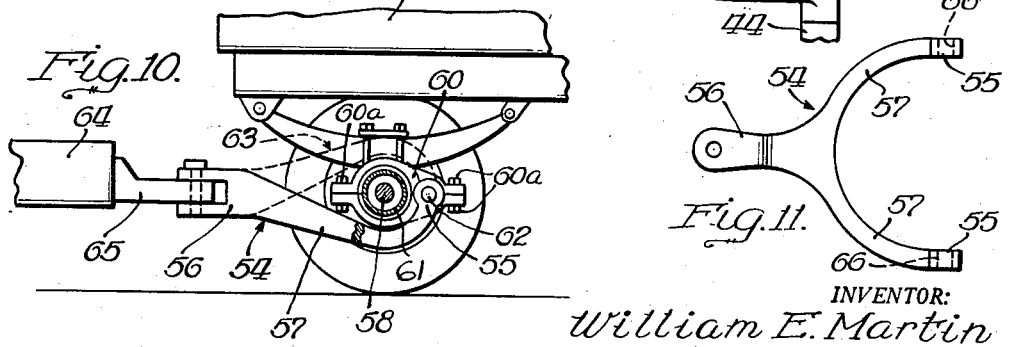
INVENTOR:
William E. Martin

United States Patent Office 2,846,237
Patented Aug. 5, 1958

2,846,237

TRUCK HITCH FOR TRAILING VEHICLES

William E. Martin, Kewanee, Ill.

Continuation of abandoned application Serial No. 95,422, May 26, 1949. This application February 25, 1954, Serial No. 412,443

10 Claims. (Cl. 280—496)

This invention relates to a truck hitch for trailing vehicles and one that lends itself to various attachments to the body or frame of the truck or to a truck mechanism such as a spring. More specifically the hitch includes a drawbar of predetermined configuration to bypass the rear truck axle and differential structure, which bar includes universal mechanism for connection with a trailing vehicle to the rear of the truck and with other universal mechanism at its other end for operative attachment to the truck in any one of various positions forwardly of the location of the rear axle structure of the truck.

These combined parts together with their more specific details and functions comprise a hitch unit adapted for connection with a conventional truck at a selected point forwardly of the rear truck axle to thereby cause the load of the trailer and its supported load to be carried ahead of the rear axle of the truck for more efficient load distribution upon both front and rear axles and upon the supporting wheels of both. And the hitch receives its best application when used with vehicles of the semi-trailer type although any kind of a vehicle may be connected with the hitch. This application comprises a continuation of my copending application Serial No. 95,422, filed May 26, 1949, now abandoned, which latter application was originally filed as a continuation-in-part application with reference to a copending application Serial No. 607,859, filed July 30, 1945, that has since matured into Patent No. 2,471,636, issued on May 31, 1949.

One of the main objects of this invention is to provide, in effect, a universal hitching arrangement that has a multipurpose bracket for securement to a suitable truck part ahead of the rear axle with a drawbar of a length to reach from the attaching means to a position behind the rear axle, the shape of the drawbar being such to establish operative clearances relative to the axle structure and truck frame or chassis for normal hauling conditions.

Although the trailing vehicle receiving end of the truck hitch may be outfitted with various connections to receive the tongue or drawbar of a trailing vehicle, the structure shown generally follows the means utilized in the above noted Patent No. 2,471,636.

As another object of this application, the truck attaching end of the drawbar has a universal connection with a bracket having universal means for simplified securement to trucks or truck frames and chassis of the various makes of trucks or hauling vehicles.

Other forms of attaching brackets and combinations of truck hitches are contemplated in carrying out the purposes of this invention. Such other forms of the invention inherently propose other objects and advantages that shall hereinafter be described and set forth in greater detail with reference to the accompanying drawings forming a part of this specification.

In the drawings:

Fig. 8 is a side elevational view of a modified arrangement of truck hitch;

Fig. 9 is a fragmentary plan view of the Fig. 8 drawbar and its connections with the vehicles joined thereby;

Fig. 10 is a further modified arrangement of truck hitch having universal attachment features; and Fig. 11 is a plan view of the drawbar used in the truck hitch of Fig. 10.

Figure 1:
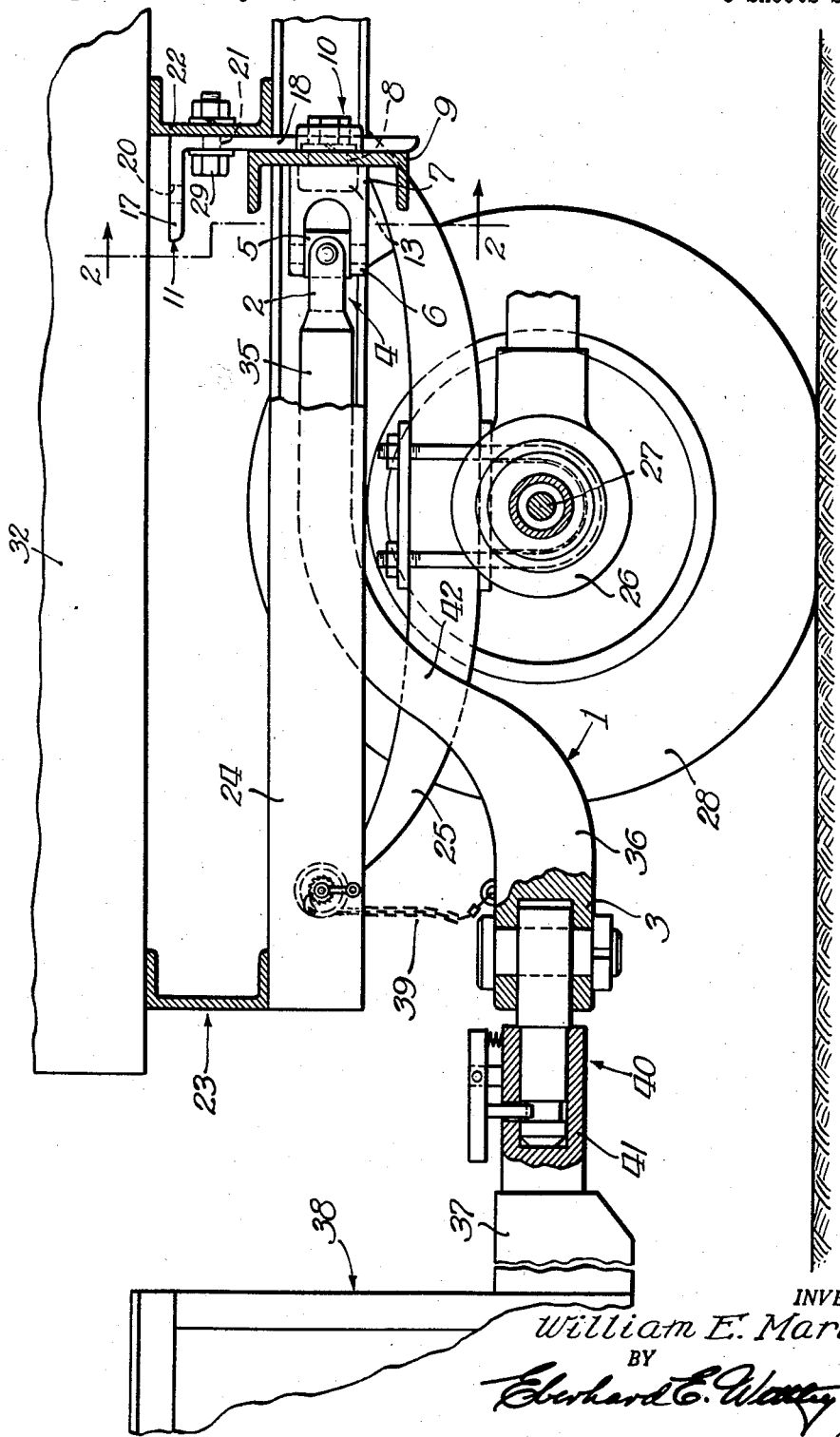
Fig. 1 is a side elevational view partially broken away and in section showing a general and typical installation of the truck hitch as connected with a conventional truck.

The general truck hitch structure is best shown in Fig. 1 and comprises a drawbar 1 having a forwardly bifurcated end 2 and a rearwardly bifurcated end 3 each adapted for connection with the hauling and trailing vehicles respectively. The end 2 forms a part of the universal joint 4 including the cross pin coupling 5 and the complementary fork 6 terminating in a block 7 having a pivot stud 8 connected with the cross channel 9 of the universal bracket 10.

Figure 2:
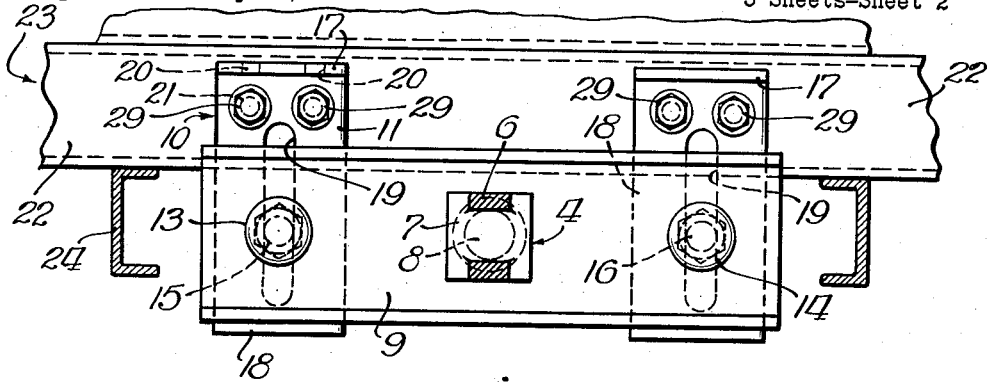
Fig. 2 is a fragmentary transverse cross sectional view in a vertical plane of a portion of the hitch at viewed along the line 2—2 in Figure 1.

As seen in Figs. 1 and 2, channel 9 extends to each side of the hitch point of the drawbar 1, and angle brackets 11 and 12 are secured to the channel 9 by screw and bolt clamps 13 and 14 each comprising pivotal means to bodily rotate the angle brackets relatively to the channel 9 when the clamps 13 and 14, or either thereof, are loosened. The screw and bolt clamps 13 and 14 are pre-located as to channel 9 by insertion through holes 15 and 16 therein, but angle brackets 11 and 12 each have horizontal and vertical legs 17 and 18 respectively with slots 19 in the vertical legs 18 for the reception of the clamps 13 and 14 therethrough.

With this arrangement the angle brackets 11 and 12 can be made to assume various angular positions with respect to the channel 9, and also, each bracket is capable of translatory movement in directions radially disposed with respect to the screw clamps 13 and 14. Angle brackets 11 and 12 have bolt holes 20 in the horizontal legs 17 and bolt holes 21 in the vertical legs 18 to facilitate fastening of the angle brackets to different surfaces of the parts of a truck.

In Figs. 1 and 2, the bracket 10 is shown attached to a cross channel 22 of the truck body frame of a truck 23 all supported upon a chassis 24 carried by suitable springs 25 upon the differential 26 housing the rear axle 27 connected with the rear wheels 28 of the towing vehicle. In this case bolts 29 are used through holes 21 in the vertical leg 18 of the angle brackets 11 and 12.

Figures 3, 4:
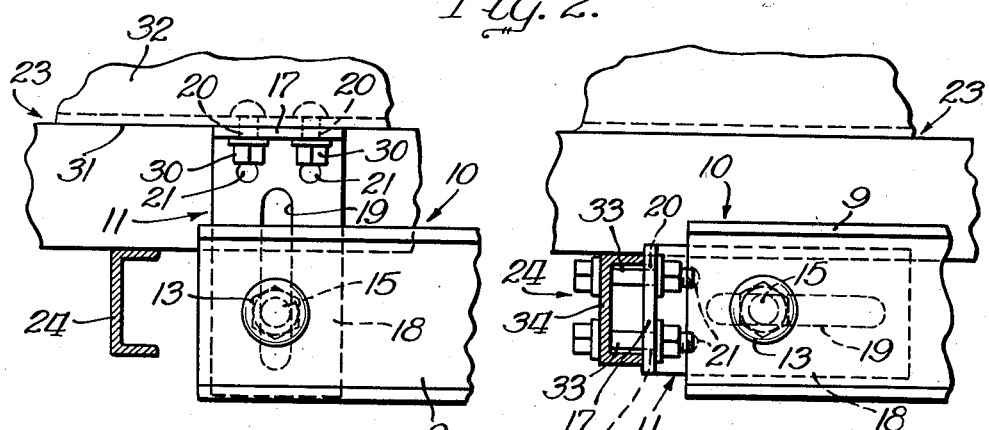
Fig. 3 shows a portion of the hitch bracket as shown in Fig. 2, but connected to a different truck part.
Fig. 4 illustrates another possible connection of the hitch bracket.

Fig. 3 illustrates the use of bolts 30 in openings 20 to fasten brackets 11 and 12 to the underside or bed 31 of the body 32 of truck 23. Fig. 4 shows bolts 33 connecting the legs 17 of the angle brackets 11 or 12 to a channel 34 of the chassis 24.

Figures 5, 6, 7:
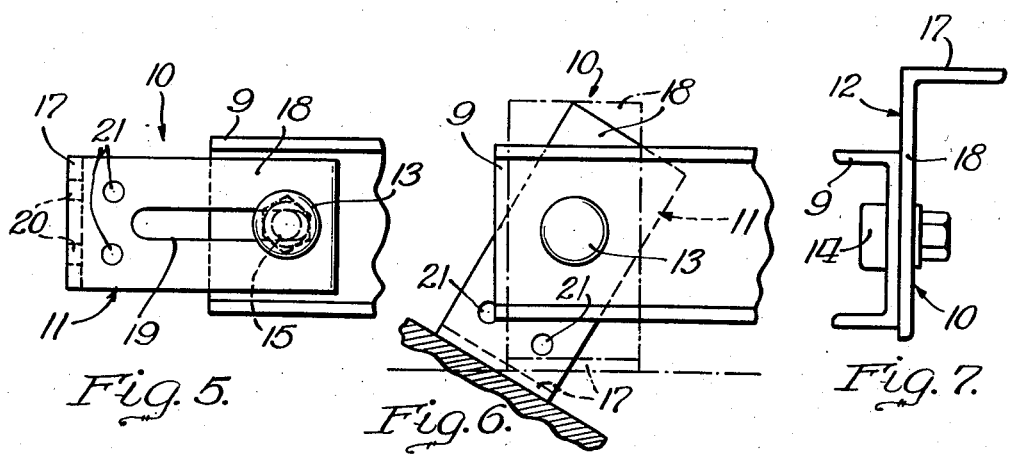
Figs. 5, 6 and 7 show other variations in the universal use of the hitch bracket for connecting the truck hitch to a truck.

Other possible connections are shown in Figs. 5, 6 and 7 wherein the leg 17 has been pointed rearwardly in each instance instead of forwardly as shown in Figs. 1 to 4 inclusive. Fig. 5 shows leg 18 of bracket 11 nested within the channel 9, while Figs. 6 and 7 indicate the unlimited angular displacement of bracket 11 or 12 in 360 degrees of swing about the pivotal clamp 13 or 14 respectively with leg 18 against the back of the channel 9 and with the leg 17 of the bracket to the rear.

Obviously, the hitch point of the drawbar 1 at channel 9 may be shifted vertically or horizontally by the proper positioning of the brackets 11 and 12 and their individual slots 19. Various angular shifts are possible by angular displacement of the brackets as shown in Fig. 6. Thus the rear end position of the truck hitch drawbar in relation to the connected parts may be varied to place the bracket connected end of the drawbar forwardly of the rear axle 27 and in a selected position to provide the necessary clearance for the drawbar.

The drawbar 1 is curved as seen in Fig. 1 to bypass the rear axle structure of the truck 23 having a section 35 of drawbar 1 at a higher level than the section 36 thereof which is disposed at a more convenient level to hook up with a tongue 37 of a semi-trailer 38. Suitable lift and limit means 39 may be used on truck 23 to connect with the section 36 of the drawbar 1 to hold the section 36 at any predetermined selected position when not in use. This means 39 is more fully described in the aforementioned co-pending application.

The described connection of the forward end of the drawbar 1 with its universal supporting bracket 10 permits pivoting of the drawbar 1 about vertical and horizontal axes in a transverse plane of the truck and bodily swinging about a longitudinal axis of the truck which axis in general passes through the pivot stud 8 and lengthwise through the section 35 of the drawbar 1.

As best shown in Fig. 1, the section 36 of the drawbar 1 is connected by another universal hitch 40 to the hitch projection 41 of the tongue 37 of the trailing semi-trailer 38. The function and operation of hitch 40 also allows motion between the connected parts about vertical and horizontal cross axes together with relative rotation about a longitudinal axis running between the vehicles. In addition, hitch 40 provides a support connection between the hitch connection 41 and the drawbar section 36 whereby the adjacent end of the semi-trailer 38 is bodily carried by the drawbar 1 and this weight is taken up by the forward end of the drawbar 1 and bracket 10 at a location ahead of the rear axle 1 of the truck 23 to distribute this load transition to both sets of wheels of the truck. Further explanation of the structure of hitch 40 may be had by reference to my Patent No. 2,471,636.

The drawbar of Fig. 1 is a single bar to provide a reach from the connected end ahead of the rear axle to the coupling point behind the rear axle, the bar having a deformed central section 42 joining end sections 35 and 36. This deformed central section 42 provides the clearance offset to bypass the truck axle and differential assembly and by the use of this type of drawbar together with the convenient bracket structure it is possible to bypass the running gear and connect with the truck at a fixed and determinable location as governed by the truck frame parts or truck bed and body. With this combination of the deformed drawbar and the disposition of the bar ends fore and aft of the rear axle, the weight is better divided and distributed over the truck wheels, and the towing and tracking efficiency of the truck and trailing vehicles is greatly improved due to the drawbar connection ahead of the rear axle of the truck as explained.

With the truck hitch of this construction it is possible to pull trailing vehicles with a conventional truck having its own independent uses and purposes without requiring the need of a special tractor unit for towing which normally is only used for that particular purpose.

To further deviate from the use of a single drawbar, it is possible to use forked or bifurcated drawbars as shown in Figs. 8 to 11 inclusive, and as more extensively illustrated and described in my Patent No. 2,471,636 hereinbefore referred to.

One such drawbar 43 is shown in Figs. 8 and 9 with modified brackets 44 having pivotal units such as shafts 44a and 44b extending inwardly from the truck sides and in aligned positions providing means to pivotally attach the drawbar to springs 45 of a truck 46 forwardly of the rear axle 47. Releasable securing mechanism or similar means such as 44c are employed to seat brackets 44 upon or over the springs 45. The pivotal arrangements associated with the forked drawbar ends 48 and 49 and the end 50 are somewhat different from the first described design, but the drawbar ends 48 and 49 may well be attached to a universal bracket such as 10 if that is desired. The end 50 of drawbar 43 connects with the tongue 51 of a semi-trailer 52 for hauling machinery, the bed 53 being carried upon a wheeled carriage 53a. The total load of trailer plus or minus the load thereon is carried by the tongue 51 reacting through the drawbar 43 resiliently supported by the springs 45 at the location of bracket 44 whereby load distribution factors are obtained that react through the attachment units that secure the springs 45 to the axle 47 of the rear wheel assembly of the truck.

Another modified truck hitch is shown in Figs. 10 and 11. Here the drawbar 54 has dual spaced truck hitches 55 disposed in the same plane as the trailer hitch 56 with the drawbar center 57 being deformed to bypass the axle 58 of a truck 59. A suitable split bracket 60 is clamped to the axle housing 61 with securing means or mechanisms 60a to place the connecting pivot pin 62 in the plane of the axle to obtain a drawbar pull at the level of the axle and at a point forwardly thereof. Drawbar 54 may be inverted for use in the dotted line position indicated at 63 under certain other desirable working conditions for drawing a trailer 64 by its tongue 65.

The variations noted indicate the possibility of varying the design within limits without departure from the fundamental concept of the invention. A bracket 44 such as shown in Fig. 8 may be inverted in relation to spring 45 to connect a drawbar in a lower position, while the bracket 60 in Fig. 10 may be axially displaced about the axle housing as a trunnion to change the locations of the pivot pins 62 that enter the bores 66 of the drawbar 54 as seen in Fig. 11. And bracket 10 has its versatility of use in this respect.

This invention is therefore not to be limited to the exact disclosures and the description relating thereto excepting as may be determined by the breadth and scope of the subject matter of the appended claims as they are directed to the essential elements constituting the devices of this invention.

What I claim is:

1. A hitch mounting for a towing truck having a chassis, a wheeled unit with an axle at the rear of said truck, and springs interposed between said chassis and connected at spaced points with the axle of said wheeled unit, said hitch mounting comprising a pair of brackets each having pivotal units extending laterally inwardly with respect to said springs in aligned relation to each other, clamp means on said brackets to secure the brackets upon the tops of said springs beneath said chassis and at points spaced forwardly of said truck axle, and a drawbar having a divided end for connection with each of said pivotal units respectively, said drawbar having a curved configuration to bypass the rear axle for connection with said bracket units, the free end of said drawbar having hitch means to connect with a trailing vehicle for towing the latter, and said laterally spaced brackets and their pivotal means providing a limited lateral flexing arrangement to accommodate certain motions of said divided end drawbar under towing conditions.

2. A hauling mechanism adapted for connection with a truck and including a hitch for connection with a trailing vehicle comprising, in combination, a wheel suspension spring means on said truck extending fore and aft with respect to the wheel axle and immediately thereabove, attachment units to secure said spring means to said axle, bracket means mounted upon said spring means and in offset relation with respect to said axle and adjacent said attachment units, and drawbar means connected with said brackets and disposed rearwardly with respect to said truck axle and adapted for connection with a trailing vehicle, said bracket means being supported upon said spring means ahead of said truck axle to cause both towing and load reactive stresses to be transmitted to said axle through the spring and the adjacent attachment units, and said drawbar extending rearwardly about said axle and terminating in a position behind said wheel suspension spring means for connection with said trailing vehicle.

3. A truck fastening to releasably secure a towing hitch to a truck for hauling connection with a trailing vehicle comprising a running gear assembly including a rear axle housing element and a further structural element connected with said truck and occupying a given relation with respect to said axle housing element, a bracket structure adapted for mounting upon one of said running gear elements in a position forwardly and ahead of said axle housing element, pivotal means carried by said bracket structure in a position ahead of said axle housing element, a drawbar structure connected with said pivotal means and having attachment means for connection with said trailing vehicle at a location disposed rearwardly of said truck axle housing element, and releasable securing mechanism to fixedly mount said bracket structure upon said one running gear elment and in a general fore and aft plane of said element, said pivotal means being adapted to connect one end of said drawbar structure with said bracket structure to transmit the draft pull in a direction lying in said fore and aft plane of said one element and from a position ahead of said axle housing element, said releasable securing mechanism providing selectively reversible means to permit bodily inversion of at least one of said structures in relation to said truck to establish a different clearance relationship between said drawbar structure and the elements of said running gear.

4. In a truck having a chassis, a running gear for said chassis including an axle housing, and leaf springs mounted upon said housing and each having connection with said chassis at spaced point fore and aft of the truck at locations remote from the axle location, the improvement which consists of a hauling hitch means connected at one end with said running gear and at its other end with a trailing vehicle, said hitch means comprising a drawbar adapted for operative draft action from a position above the leaf springs of said running gear to a position below and rearwardly of said leaf springs, said drawbar being vertically swingable in the area between and flanking said springs and in the space above the axle housing, and brackets mounted in secured positions over the leaf springs and including pivotal members, said brackets each being positioned in spaced relation to one side of the axle mounting adjacent the spring considered along the length of the spring, said drawbar having connection with said pivotal members of the brackets to support the adjacent end portions of said drawbar at points in proximity to said spring-axle mounting to keep additional spring flexing to a minimum while providing drawbar supporting points for said drawbar with limited resiliency under operative conditions and to transmit the draft line of pull of said drawbar in the general direction of the length of the spring.

5. A hauling mechanism adapted for connection with a truck to provide a hitch connection for a trailing vehicle comprising, in combination, a wheel suspension spring means on said truck extending fore and aft of the truck, a wheel axle housing, securing means to fasten said spring means to said axle housing, bracket means mounted to seat upon said spring means and in offset forwardly relation with respect to the point of attachment of the securing means with said spring means, and drawbar means connected with said bracket means ahead of said axle housing and extending rearwardly with respect to the axle housing and there beyond in a position that is oppositely related to said housing as considered with respect to the location of the connection of the bracket means with said spring means.

6. A truck fastening to releasably secure a hitch to laterally spaced and longitudinally positioned springs on said truck to provide a hauling connection with a trailing vehicle, said fastening comprising a pair of brackets to seat over said springs, said brackets having laterally inwardly positioned and aligned pivotal units thereon to overhang the side portions of said springs, securing mechanism to fasten said brackets in fixed positions upon said springs, and a drawbar having a yoke for individual spaced connection with said pivotal units and including means to provide a hauling connection for a trailing vehicle, said drawbar having vertical swinging freedom laterally between the side portions of said springs as determined by said pivotal units, said pivotal units each providing limited flexing supports for said drawbar by reason of the attachment of the units with the brackets carried upon said laterally spaced springs.

7. A hitch attachment for a pulling vehicle to provide releaseable means to secure a trailing vehicle in towing relation with respect to said pulling vehicle comprising, in combination, a wheel assembly for said pulling vehicle including springs interposed between said wheel assembly and said pulling vehicle, and attaching structures for each of said springs respectively each comprising a bracket seated upon a spring, a pivotal member on said bracket disposed in vertical relation with respect to said bracket and adapted to react downwardly through said bracket against said spring, a drawbar connected with said pivotal members and having hitch means for coupling with said trailing vehicle, and securing mechanisms to mount said brackets in fixed relation upon their associated springs, said springs extending fore and aft of the pulling vehicle and including intermediate securing means to fasten the springs to the axle of the wheel assembly, and said brackets each being seated upon said springs forwardly with respect to the wheel assembly axle and in relation to the securing means joining the springs to the axle.

8. A truck fastening to releasably secure a towing hitch to a truck for hauling connection with a trailing vehicle comprising a running gear assembly including a rear axle housing element and a further structural element connected with said truck and occupying a given relation with respect to said axle housing element, a pair of bracket structures adapted for mounting upon one of said running gear elements to occupy positions forwardly and ahead of said axle housing element, pivotal means carried by said bracket structures in positions ahead of said axle housing element, a drawbar structure having a divided end connected with said pivotal means and having attachment means for connection with said trailing vehicle at a location disposed rearwardly of said truck housing element, and releasable clamp means for each of said bracket structures to fixedly mount said bracket structures in predetermined radial positions upon said truck axle housing element and in general fore and aft planes with respect to said axle housing element, said pivotal means being adapted to connect the divided ends of the drawbar structure with said bracket structures to transmit the draft pull in a direction lying in fore and aft planes with respect to said axle housing element and from positions ahead of said axle housing element, said releasable clamp means each providing selectively reversible mechanisms to permit bodily inversion of at least certain of said structures in relation to said truck to establish a different clearance relationship between said drawbar structure and the elements of said running gear.

9. A truck fastening to releasably secure a towing hitch to a truck for hauling connection with a trailing vehicle comprising a running gear assembly including a rear axle housing element and a further structural element connected with said truck and occupying a given relation with respect to said axle housing element, a pair of bracket structures adapted for mounting upon one of said running gear elements to occupy positions forwardly and ahead of said axle housing element, pivotal means carried by said bracket structures in positions ahead of said axle housing element, a drawbar structure having a divided end connected with said pivotal means and having attachment means for connection with said trailing vehicle at a location disposed rearwardly of said truck housing element, and releasable clamp means for each of said bracket structures to fixedly mount said bracket structures in predetermined radial positions upon said truck axle housing element and in general fore and aft planes with respect to said axle housing element, said pivotal means being adapted to connect the divided ends of the drawbar structure with said bracket structures to transmit the draft pull in a direction lying in fore and aft planes with respect to said axle housing element and from positions ahead of said axle housing element, said releasable clamp means each providing selectively reversible mechanisms to permit bodily inversion of at least certain of said structures in relation to said truck to establish a different clearance relationship between said drawbar structure and the elements of said running gear, said releasable clamp means each including circular clamp units to annularly encompass said axle housing element and at laterally spaced points thereon whereby to angularly shift the positions of said pivotal means of said bracket structures about said axle housing structure and to provide means to preposition the connected divided ends of said drawbar structure in predetermined selected radial relation with respect to the axle housing element of said truck.

10. A truck fastening to releasably secure a towing hitch to a truck for hauling connection with a trailing vehicle comprising a running gear assembly including a rear axle housing element and a further structural element connected with said truck and occupying a given relation with respect to said axle housing element, a pair of bracket structures adapted for mounting upon one of said running gear elements to occupy positions forwardly and ahead of said axle housing element, pivotal means carried by said bracket structures in positions ahead of said axle housing element, a drawbar structure having a divided end connected with said pivotal means and having attachment means for connection with said trailing vehicle at a location disposed rearwardly of said truck housing element, and releasable clamp means for each of said bracket structures to fixedly mount said bracket structures in predetermined radial positions upon said truck axle housing element and in general fore and aft planes with respect to said axle housing element, said pivotal means being adapted to connect the divided ends of the drawbar structure with said bracket structures to transmit the draft pull in a direction lying in fore and aft planes with respect to said axle housing element and from positions ahead of said axle housing element, said releasable clamp means each providing selectively reversible mechanisms to permit bodily inversion of at least certain of said structures in relation to said truck to establish a different clearance relationship between said drawbar structure and the elements of said running gear, said brackets structural providing means to position said pivotal means in a horizontal plane lying coincident with said axle housing element, and said drawbar structure being arched to bypass said axle housing element when actively connected with said pivotal means and said trailing vehicle, said arched drawbar structure having the facility for connection with said pivotal means of said bracket structures from locations passing either under or over said axle housing element while disposed for hauling connection with said trailing vehicle.

References Cited in the file of this patent
UNITED STATES PATENTS

| | | |
|---|---|---|
| 1,185,435 | Powell | May 30, 1916 |
| 1,315,498 | Holland | Sept. 9, 1919 |
| 1,379,399 | Ferguson | May 24, 1921 |
| 1,590,582 | Johnson et al. | June 29, 1926 |
| 2,408,531 | Riemann et al. | Oct. 1, 1946 |
| 2,471,184 | Andrews | May 24, 1949 |
| 2,471,636 | Martin | May 31, 1949 |
| 2,516,813 | Valin | July 25, 1950 |
| 2,711,908 | Saxon | June 28, 1955 |